(12) United States Patent
Kohlberg et al.

(10) Patent No.: US 6,712,298 B2
(45) Date of Patent: Mar. 30, 2004

(54) METHOD AND DEVICE FOR CRUSHING GLASS BODIES BY MEANS OF MICROWAVE HEATING

(75) Inventors: Uwe Kohlberg, Mainz-Kastel (DE); Hildegard Römer, Karben (DE); Michael Kohl, Ingelheim (DE); Thorsten Gerdes, Dortmund (DE)

(73) Assignee: Schott Glas, Mainz (DE)

( * ) Notice: Subject to any disclaimer, the term of this patent is extended or adjusted under 35 U.S.C. 154(b) by 132 days.

(21) Appl. No.: 09/793,732

(22) Filed: Feb. 27, 2001

(65) Prior Publication Data

US 2001/0040196 A1 Nov. 15, 2001

(30) Foreign Application Priority Data

Feb. 29, 2000 (DE) .......................... 100 09 569

(51) Int. Cl.[7] .............................................. B02C 19/18
(52) U.S. Cl. ........................................... 241/1; 241/301
(58) Field of Search .......................... 241/1, 301, 23, 241/65

(56) References Cited

U.S. PATENT DOCUMENTS 4,565,913 A   1/1986   Yatsurugi
6,024,306 A   2/2000   Koppl

FOREIGN PATENT DOCUMENTS

| DE | 3428255 | 9/1986 |
|----|---------|--------|
| DE | 19541539 | 5/1997 |
| DE | 19727441 | 1/1999 |
| DE | 19834447 | 2/2000 |

*Primary Examiner*—Mark Rosenbaum
(74) *Attorney, Agent, or Firm*—Millen, White, Zelano & Branigan, P.C.

(57) ABSTRACT

The present invention relates to a method and a device for crushing glass bodies, in which the glass body 18 is arranged in a microwave field 4, so that the said glass body 18 is crushed on account of the resulting thermal stresses. In addition, a local plasma 20, which results in further thermal stresses, is produced on the surface of the glass body 18. Since the glass body 18 to be crushed does not come into contact with crushing means, for example rollers or the like, the pieces of broken glass 22 cannot be contaminated by abrasion particles of the crushing means. The plasma 20 permits a rapid and economic crushing of the glass bodies.

33 Claims, 4 Drawing Sheets

METHOD AND DEVICE FOR CRUSHING GLASS BODIES BY MEANS OF MICROWAVE HEATING

The invention relates to a method and a device for crushing glass bodies.

In order to produce a glass melt, the ground glass-forming agents, fluxing agents and stabilizers as well as admixed pieces of broken glass or even pieces of broken glass alone are heated in a melting furnace. After the melting, the viscous glass can be further processed by casting, rolling, drawing and other treatment processes. The pieces of broken glass introduced during melting are fragments of re-used glass bodies or even glass bodies originating directly from glass production. Since the re-used glass bodies or the glass bodies originating from glass production are articles with different dimensions and in part very large dimensions, they have to be crushed before being charged into the melting furnace.

In the case of the crushing methods known from the prior art, use is made of mechanical crushing means. In this way, for example, methods of crushing glass bodies are known in which the glass body is pressed through two rotating rollers, the distance between the two rollers being selected to be smaller than the dimensions of the glass body to be crushed. With a suitable torque of the rollers the strength of the glass body is exceeded, so that the latter is shattered and is crushed into pieces of broken glass.

A drawback of this method according to the prior art is that the glass bodies to be crushed are contaminated by the generally metallic abrasion particles of the mechanical crushing means, such as for example the rollers mentioned above. As a result, the properties of the glass to be produced from the melt formed are altered. In this way, for example, in the case of optical glasses particular importance is attached to the precise setting of the optical properties, such as the refractive index, transmission or colouring. These properties are adversely affected by the included impurities, so that either a glass of inferior quality is produced or the impurities have to be removed by complicated subsequent-cleaning steps, such as for example magnetic separation.

A method of crushing silicon rods, which are to be used for the production of semiconductor material in accordance with the Czochralski method, is known from U.S. Pat. No. 4,565,913. In the case of the known method a silicon body is subjected to a microwave radiation which produces a locally differing heating of the silicon body, so that the latter is shattered as a result of thermal stresses.

The object of the invention is to provide a method which allows an economic and rapid crushing of glass bodies, without contaminating the resulting pieces of broken glass, in which case the pieces of broken glass should have as small a particle size as possible. This object is attained according to the invention by the features of claim 1.

In addition, an object of the invention is to provide a device for performing the method according to the invention. This object is attained according to the invention by the features claim 12.

Glass bodies are understood below to be any bodies of different size and consisting of glass, for example panes, rods or pieces of glass which are to be smashed into smaller pieces of broken glass.

In the method according to the invention the glass body is arranged in a microwave field. As a result of dielectric losses in the glass body, energy which is used to heat the glass body is taken from the microwave field. In this case the interior of the glass body is heated to a greater degree than the outer peripheral regions, so that temperature differences occur which lead to thermal stresses. When the thermal stresses exceed a threshold value specific to the material, the glass shatters.

Since the crushing takes place without contact, the resulting pieces of broken glass are not contaminated by abrasion particles of crushing means which come into contact with the pieces of broken glass. By preventing such a contamination, it is possible to produce glass of good quality or better quality than by breaking glass in the conventional manner.

In an advantageous embodiment of the method according to the invention a plasma is produced locally on the surface of the glass body. The plasma, which can be produced by any known methods, such as for example by an electric arc or by a very high temperature, extends over an area of the surface of the glass body, so that the latter is heated locally. The local heating by the plasma performed in addition to the microwave heating results on the one hand in a more rapid heating of the glass body and thus in a greater heating rate and on the other hand in thermal stresses inside the glass body which originate from the temperature difference between the locally heated surface and the rest of the glass body. This results in a rapid and economic crushing.

In a further advantageous embodiment the plasma is produced by at least one electrode which consists of a material with a high dielectric constant. The electrode is arranged in the microwave field in the vicinity of the surface of the glass body, so that the plasma produced can affect part of the surface of the glass body thermally.

In a particularly advantageous embodiment of the method according to the invention the plasma is produced by at least two electrodes which consist of a material with a high dielectric constant. The electrodes are arranged in the vicinity of the surface of the glass body, so that the plasma produced can affect part of the surface of the glass body thermally. It is advantageous to use electrodes which have at least one sharp-edged or pointed region. It is in the sharp-edged or pointed regions of the electrodes arranged in the microwave field where particularly high microwave-field intensities, which are intended to result in the disruptive strength of the gas phase being exceeded, occur. In addition, the high dielectric constant produces high field intensities at the electrodes, as a result of which the plasma ignites more easily.

A particularly rapid shattering can be achieved for example in that individual carbon fibres are arranged as electrodes below the glass body. Since the glass body is in direct contact with the carbon fibres, however, visible inclusions of carbon can occur in the case of relatively long heating phases. Although such impurities can be prevented with SiC rods and SiC powder as the plasma-ignition source, when SiC rods or SiC powder is or are used the times for the temperature treatment until the fracture of the glass bodies increase to a considerable extent as compared with when C fibres are used. In a further advantageous embodiment of the method the electrodes are formed by a plurality of projecting tips of a body. In this way, for example, it is possible to use graphite wool, the projecting fibres of which form the electrodes.

It has been found to be advantageous if the glass functions locally as a counter electrode and the electric arcs burn between the tips of the electrodes and the hot spots of the glass body.

In order to avoid inclusions of carbon and in order to reduce the treatment time, it is advantageous to use two electrodes, preferably graphite electrodes, which are arranged adjacent and obliquely to each other at a distance from the surface of the glass body.

A plasma is ignited between the electrodes when the microwave field is switched on. This heats the glass locally, whereupon microwave absorption of the glass at this point is increased. The process now becomes self-energizing, since the glass acts as a counter electrode to the graphite electrodes. The thermal stresses induced during this process between the hot glass heated by the microwave field and the surrounding cold glass results in a shattering of the glass body. The more electrodes are used, the more effective does the crushing become, since a plurality of electrode/glass plasma arc-overs occur, which has been found to be advantageous, particularly in the case of relatively large workpieces.

In principle, the smaller the distance selected between the electrode and the glass, the smaller the area of glass heated. The distances should thus be selected as a function of the desired range of heating.

It has been found that good results can be obtained with a distance of 3 mm between the electrode and the glass body and a distance of 1 mm between the electrodes.

The invention is explained in greater detail below by way of two embodiments with reference to the accompanying drawings, in which FIG. 1 is a diagrammatic illustration of the device for the continuous crushing of glass bodies;

Figure 1:
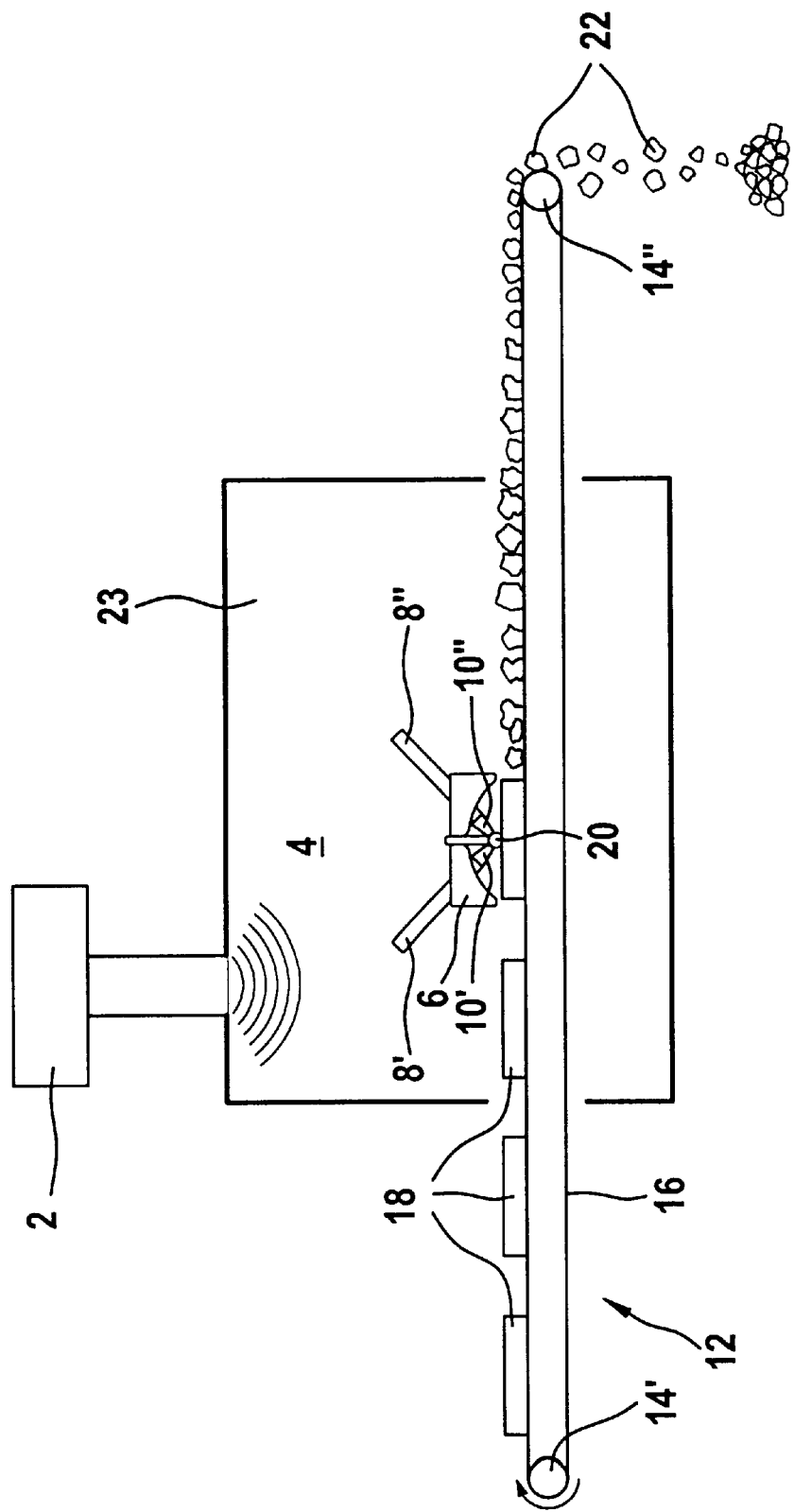

FIG. 1 is a diagrammatic illustration of the device according to the invention for crushing glass bodies, with reference to which the method according to the invention will also be described. The device comprises a microwave source 2 which produces a microwave field 4. Depending upon the design of the device according to the invention, it is also possible for a plurality of microwave sources 2 to be provided adjacent to one another. A monomode resonator, a multimode resonator or the like can be used for example as the microwave source. In order to protect the environment from the microwaves, a screen 23 is provided for limiting the microwave field 4. An electrode-holding means 6 is arranged in the microwave field 4. The electrode-holding means 6 receives two graphite electrodes 8', 8'' which are constructed in the form of rods and each have a tip 10', 10'' at one end. The graphite electrodes 8', 8'' are arranged obliquely to each other, and the tips 10', 10'' face each other. The distance between the electrode tips is 1 mm.

In addition, the device according to the invention has a conveying device 12 which in the embodiment described is constructed in the form of a conveyor belt 16 which is guided on rollers 14', 14'' and which is driven by the rollers 14', 14''. Individual glass bodies 18 are supplied continuously on the conveyor belt 16, so that what is involved is a device for the continuous crushing of glass bodies 18. The conveyor belt 16 is arranged in such a way that the individual glass bodies 18 can be moved into the region of the tips 10', 10'' of the graphite electrodes 8', 8'', a distance of approximately 1 mm remaining between the surface of the glass bodies 18 and the tips 10', 10'' of the graphite electrodes 8', 8''.

An electric arc, which leads to $CO/CO_2$ emissions which result in an intensely focused globular plasma 20, ignites between the tips 10', 10'' of the graphite electrodes 8', 8'' when the microwave field 4 is switched on.

The glass bodies 18 are moved continuously into the microwave field 4 on the conveyor belt 16. The microwave field 4 influences the individual glass body 18 in that it is heated to different degrees in its various areas, which results in thermal stresses inside the glass body 18. On the further conveying path the glass body 18 passes the tips 10', 10'' of the graphite electrodes 8', 8''. When passing the electrode tips 10', 10'' the glass body 18 arrives in the region of the globular plasma 20, which extends between the tips 10', 10'' and the glass body 18. In this way, part of the surface of the glass body 18 is heated, so that further thermal stresses occur inside the individual glass body 18 as a result of the different temperatures. The thermal stresses—produced by the microwave field 4 and the plasma 20—in the glass body result in the glass body 18 shattering when the strength threshold values specific to the material are exceeded, so that the glass body is shattered into pieces of broken glass 22 which are removed by way of the conveyor belt 16.

Figure 2:
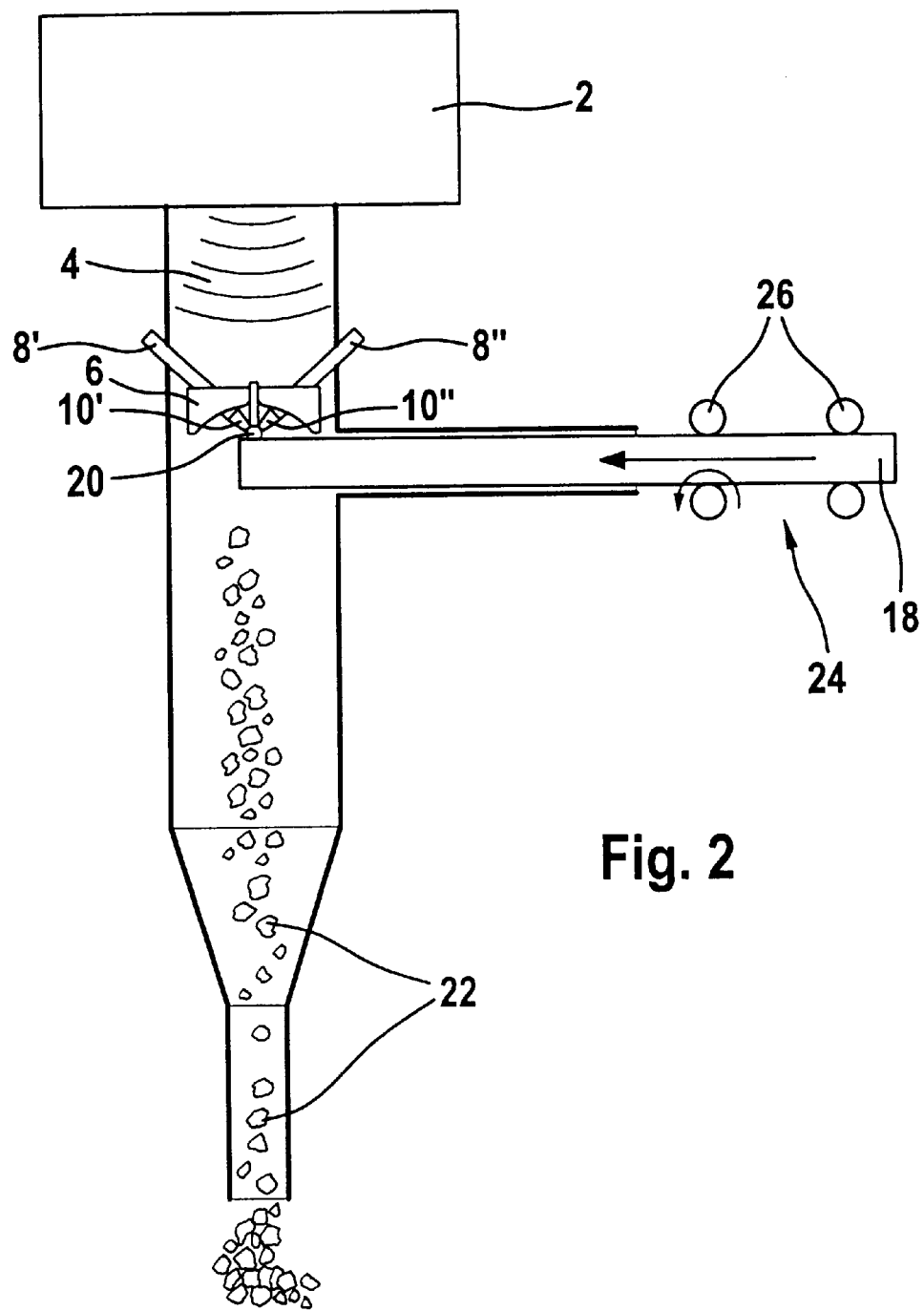
FIG. 2 is a diagrammatic illustration of the device for the quasi-continuous crushing of glass bodies.

FIG. 2 is a diagrammatic illustration of a further embodiment of the device according to the invention for crushing glass bodies. In contrast to the embodiment of FIG. 1, the embodiment illustrated is a device for the quasi-continuous crushing of glass bodies. The two embodiments are provided in part with the same components, the same components having the same reference numerals. The glass body 18 to be crushed is constructed in the form of a long glass rod which is inserted stepwise into the region of the plasma 20 and the microwave field 4. After the region of the rod-shaped glass body 18 subjected to the microwave field and the plasma is shattered and thus crushed into pieces of broken glass 22, the rod-shaped glass body 18 is again advanced by an amount into the region of the plasma 20 and the microwave field 4 and is crushed. This is repeated until the rod-shaped glass body 18 has been completely crushed. The conveying device 24 can consist for example of pairs of rollers 26 which move the glass body 18 situated therein by a rotational movement in a translatory manner into the region of the microwave field 4 and the plasma 20.

Figure 3A:
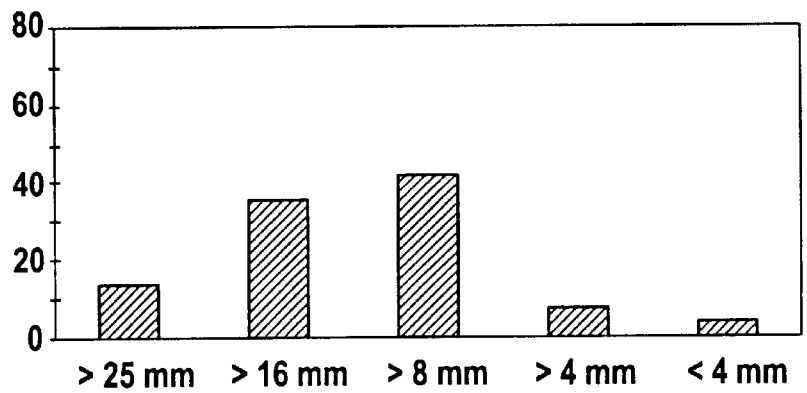
FIGS. 3a, 3b, 3c are diagrams of the particle-size distribution after microwave crushing when a carbon felt is used.
Figure 3B:
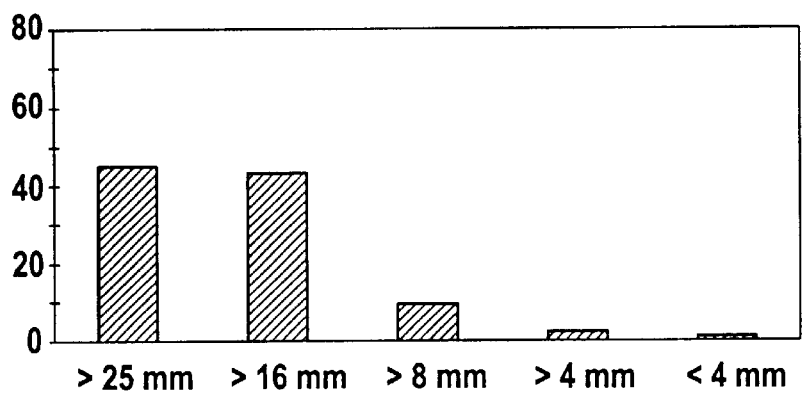
Figure 3C:
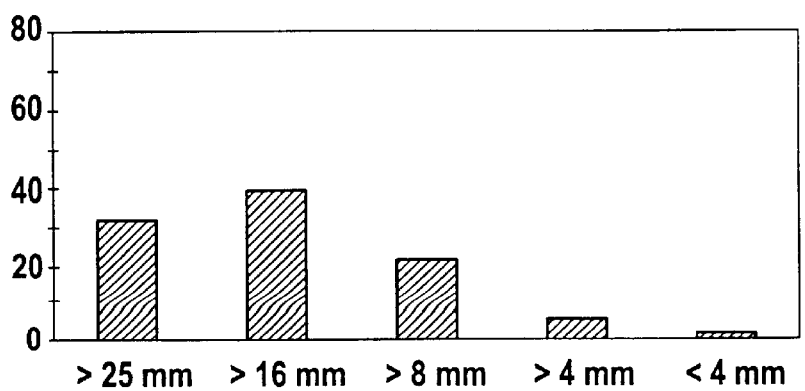

FIGS. 3a, 3b and 3c show the particle-size distribution after a microwave crushing when a carbon felt is used, round pieces LaSF 39 being crushed in the first case (FIG. 3a), fragments 8056 in the second case (FIG. 3b) and rods LF5 in the third case (FIG. 3c).

Figure 4A:
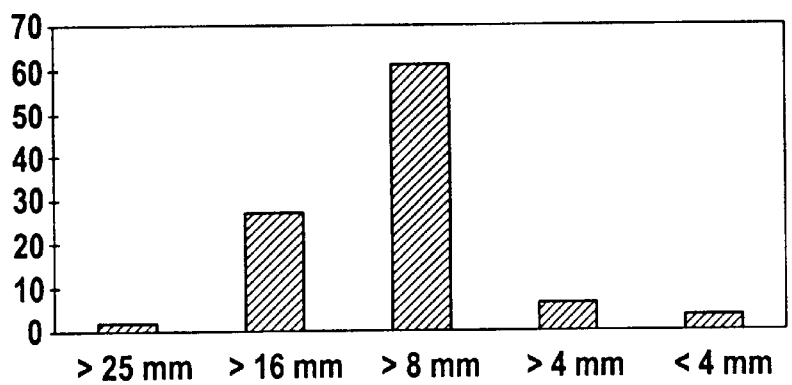
FIGS. 4a, 4b, 4c are diagrams of the particle-size distribution after microwave crushing when graphite electrodes are used.
Figure 4B:
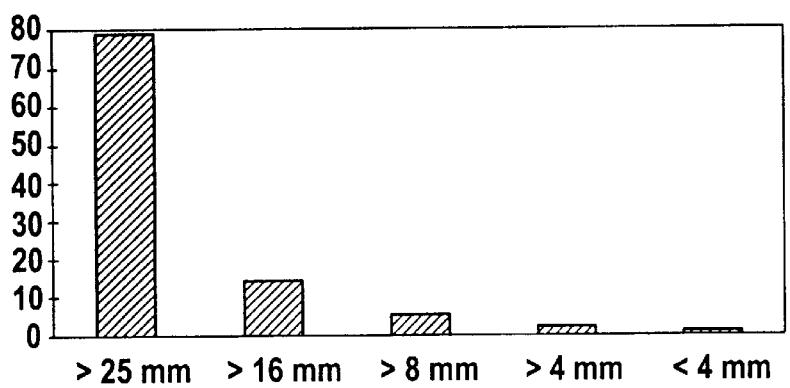
Figure 4C:
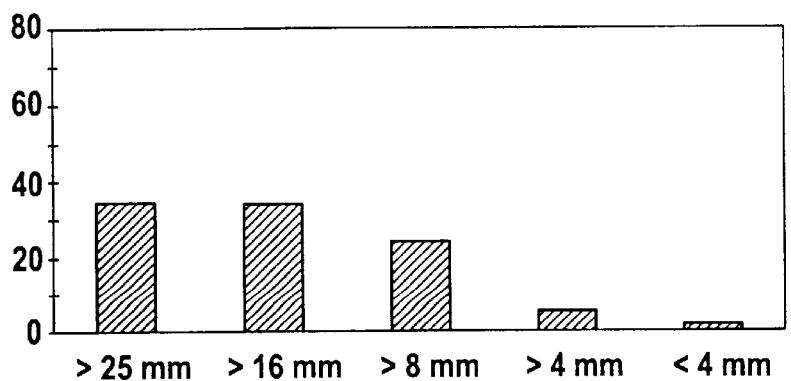

FIGS. 4a, 4b and 4c show the particle-size distribution after a microwave crushing when graphite electrodes are used, round pieces LaSF 39 being crushed in the first case (FIG. 4a), fragments 8056 in the second case (FIG. 4b) and rods LF5 in the third case (FIG. 4c).

In tests the best results with respect to the necessary clock times and the purity requirements have been achieved when using the graphite electrodes. In addition, the method with the graphite electrodes can be transferred to a commercial scale in a simple manner.

What is claimed is:

1. A method of crushing a glass body (18) having a surface thereon comprising:
   placing the glass body in a microwave field; and subjecting the glass body to a plasma field produced locally on the surface of the glass body while the glass body is in the microwave field to thereby create thermal stresses in the glass body whereby the glass body, is crushed.

2. A method according to claim 1 characterized in that, in order to produce the local plasma (20), at least one electrode (8', 8''), which consists of materials with a high dielectric constant, is arranged in the microwave field (4) in the vicinity of the surface of the glass body (18).

3. A method according to claim 2, characterized in that at least two electrodes (8', 8") are used in order to produce the local plasma (20).

4. A method according to claim 3, characterized in that the glass body (18) functions locally as a counter electrode and electric arcs burn between the electrode or the electrodes (8', 8") and the glass body (18).

5. A method according to claim 2, characterized in that the glass body (18) functions locally as a counter electrode and electric arcs burn between the electrode or the electrodes (8', 8") and the glass body (18).

6. A method according to claim 5, characterized in that the electrode or the electrodes (8', 8") used to produce the local plasma have at least one sharp-edged or pointed region (10', 10").

7. A method according to claim 2, characterized in that the electrode or the electrodes (8', 8") produce the local plasma with at least one sharp-edged or pointed region (10',10").

8. A method according to claim 7, characterized in that the local plasma is produced with at least two electrodes (8', 8") are arranged adjacent and obliquely to each other, and with the sharp-edge or pointed regions (10', 10") facing one another.

9. A method according to claim 8 characterized in that in producing the local plasma at least two electrodoes (8', 8") form an acute angle.

10. A method according to claim 9, characterized in that the sharp-edged or pointed regions (10', 10") used to produce the local plasma are arranged at a distance of 1 mm from one another and at a distance of 3 mm from the glass body (18).

11. A method according to claim 8, characterized in that the sharp-edged or pointed regions (10', 10") are arranged at a distance of 1 mm from one another and at a distance of 3 mm from the glass body (18) to produce the local plasma.

12. A method according to claim 11, characterized in that the electrodes (8', 8") are graphite electrodes.

13. A method according to claim 2, characterized in that the electrodes (8', 8") used to produce the local plasma are graphite electrodes.

14. A method according to claim 13, characterized in that two electrodes (8', 8") used to produce the local plasma are arranged in the microwave field (4).

15. A method according to claim 2, characterized in that the local plasma is produced by two electrodes (8', 8") arranged in the microwave field (4).

16. A device for performing a method of crushing a glass body by placing the glass body in a microwave field while the glass body is subject to a plasma field produced locally on a surface of the glass body, comprising:

means (2) for producing a microwave field (4), conveying means (12, 24) for conveying the glass body (18) into the microwave field, and means (6, 8', 8") for producing a local plasma (20) on the surface of the glass body (18).

17. A device according to claim 16, characterized in that the means (6,8', 8") for producing the local plasma (20) comprise at least one electrode (8', 8") which consists of material with a high dielectric constant, wherein the electrode (8', 8") is arranged in the microwave field (4) in the vicinity of the surface of the glass body (18).

18. A device according to claim 16, characterized in that the means (6, 8', 8") for producing the local plasma (20) comprise at least two electrodes (8', 8") which consist of materials with a high dielectric constant, wherein the electrode (8', 8") are arranged in the microwave field (4) in the vicinity of the surface of the glass body (18).

19. A device according to claim 18, characterized in that the electrode or the electrodes (8', 8") has or have at least one sharp-edged or pointed region (10', 10").

20. A device according to claim 17, characterized in that the electrode or the electrodes (8', 8") has or have at least one sharp-edged or pointed region (10', 10").

21. A device according to claim 20, characterized in that the at least two electrodes (8', 8") are arranged adjacent to each other, wherein the sharp-edged or pointed regions (10', 10") face one another.

22. A device according to claim 21, characterized in that the sharp-edge or pointed regions (10', 10") are arranged at a distance of 1 mm from one another and at a distance of 3 mm from the glass body (18).

23. A device according to claim 22, characterized in that the electrodes (8', 8") consist essentially of graphite.

24. A device according to claim 17, characterized in that the electrodes (8', 8") consist essentially of graphite.

25. A device according to claim 24, characterized in that two electrodes (8', 8") are arranged in the microwave field (4).

26. A device according to claim 17, characterized in that two electrodes (8', 8") are arranged in the microwave field (4).

27. A device according to claim 26, characterized in that the electrodes (8', 8") are formed by projecting tips of a body.

28. A device according to claim 27 wherein the body (8', 8") is made of graphite wool, projecting fibers of which form the projecting tips.

29. A device according to claim 17, characterized in that the electrodes (8', 8") are formed by projecting tips of a body.

30. A device according to claim 29, characterized in that the glass body (18) is locally a counter electrode, so that electric arcs burn between the electrodes (8', 8") and the glass body (18).

31. A device according to claim 29 wherein the body (8', 8") is made of graphite wool, projecting fibers of which form the projecting tips.

32. A device according to claim 17, characterized in that the glass body (18) is locally a counter electrode, so that electric arcs burn between the electrodes (8', 8") and the glass body (18).

33. A device for performing a method of crushing a glass body, comprising:

means (2) for producing a microwave field (4);

conveying means (12, 24) for conveying the glass body (18) into the microwave field, and means (6, 8', 8") for producing a local plasma (20) on the surface of the glass body (18) while the glass is subject to the microwave field.

* * * * *

UNITED STATES PATENT AND TRADEMARK OFFICE
CERTIFICATE OF CORRECTION

PATENT NO. : 6,712,298 B2  
DATED : March 30, 2004  
INVENTOR(S) : Uwe Kolberg et al.

It is certified that error appears in the above-identified patent and that said Letters Patent is hereby corrected as shown below:

Title page,
Item [75], Inventors, reads "Kohlberg, Mainz-Kastel" should read -- Kolberg, Mainz --; reads "Ingelheim" should read -- Dorsten --; reads "Dortmund" should read -- Bayreuth --

Column 5,
Line 18, reads "(10',10")." should read -- (10', 10"). --
Line 21, reads "are arranged" should read -- arranged --
Line 57, reads "(6,8)" should read -- (6, 8) --

Column 6,
Lines 4-5, reads "electrode" should read -- electrodes --
Line 19, reads "sharp-edge" should read -- sharp-edged --

Signed and Sealed this

Fifth Day of October, 2004

JON W. DUDAS
*Director of the United States Patent and Trademark Office*